(12) United States Patent
Thienard

(10) Patent No.: US 8,544,137 B2
(45) Date of Patent: Oct. 1, 2013

(54) UNIVERSAL FLAT WINDSCREEN-WIPER BLADE AND ASSOCIATED REMOVABLE CONNECTOR

(75) Inventor: Jean-Claude Thienard, Gisors (FR)

(73) Assignee: Valeo Systèmes d'Essuyage, Le Mesnil-Saint-Denis (FR)

( * ) Notice: Subject to any disclaimer, the term of this patent is extended or adjusted under 35 U.S.C. 154(b) by 1223 days.

(21) Appl. No.: 11/793,967

(22) PCT Filed: Dec. 16, 2005

(86) PCT No.: PCT/EP2005/013592
§ 371 (c)(1),
(2), (4) Date: Jan. 18, 2008

(87) PCT Pub. No.: WO2006/069648
PCT Pub. Date: Jul. 6, 2006

(65) Prior Publication Data
US 2009/0199357 A1 Aug. 13, 2009

(30) Foreign Application Priority Data
Dec. 23, 2004 (FR) .................................... 04 13794

(51) Int. Cl.
*B60S 1/40* (2006.01)
(52) U.S. Cl.
USPC .................................... 15/250.32; 15/250.43
(58) Field of Classification Search
USPC ............. 15/250.32, 250.201, 250.44, 250.43, 15/250.361
See application file for complete search history.

(56) References Cited

U.S. PATENT DOCUMENTS

| | | | | | |
|---|---|---|---|---|---|
| 2,508,056 | A | * | 5/1950 | Zaiger | 15/250.32 |
| 3,179,969 | A | * | 4/1965 | Glynn | 15/250.32 |
| 3,254,358 | A | * | 6/1966 | Wise | 15/250.32 |
| 3,780,394 | A | * | 12/1973 | Quinlan et al. | 15/250.32 |
| 5,435,041 | A | * | 7/1995 | Ho | 15/250.32 |
| 6,625,842 | B1 | * | 9/2003 | De Block | 15/250.32 |
| 2004/0211021 | A1 | * | 10/2004 | Weber et al. | 15/250.32 |
| 2004/0244137 | A1 | * | 12/2004 | Poton | 15/250.32 |

FOREIGN PATENT DOCUMENTS

| | | |
|---|---|---|
| DE | 103 26 266 A1 | 1/2004 |
| DE | 103 20 930 A1 | 11/2004 |
| JP | 2002-308063 | * 10/2002 |
| WO | WO-02/053421 | 7/2002 |
| WO | WO-03/084790 | 10/2003 |

OTHER PUBLICATIONS

International Search Report for PCT/EP2005/013592 mailed Apr. 6, 2006 w/ English translation (4 pages).

* cited by examiner

*Primary Examiner* — Gary Graham
(74) *Attorney, Agent, or Firm* — Osha Liang LLP

(57) ABSTRACT

The present invention relates to a flat windscreen-wiper blade 100 in particular for a windscreen-wiper system of a motor vehicle, comprising a wiping strip 110 on which a linking support 120 is mounted, which is intended to connect said flat windscreen-wiper blade 100.
The invention is noteworthy in that the linking support 120 can be solidly and rigidly attached in a removable manner to a connector 130, 140, 150 which is, itself, capable of being coupled in a removable manner with a drive arm 160, 170, 180.

9 Claims, 12 Drawing Sheets

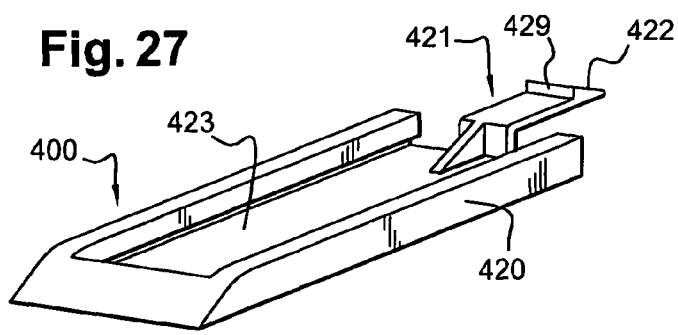
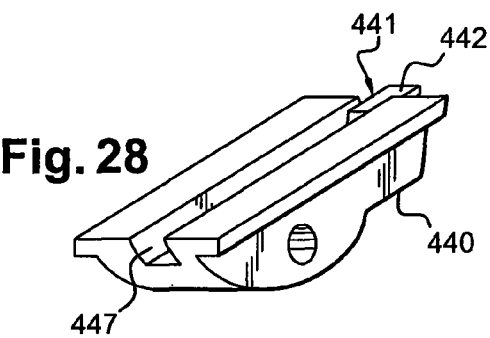
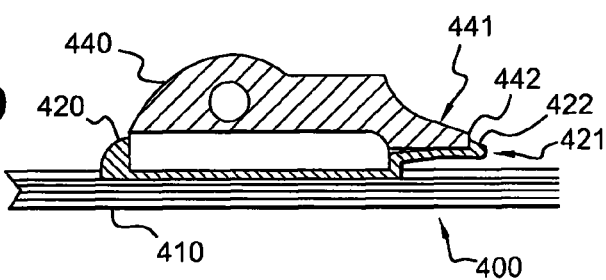
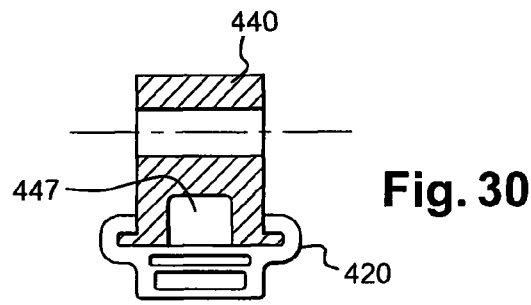

ND ASSOCIATED REMOVABLE
UNIVERSAL FLAT WINDSCREEN-WIPER BLADE AND ASSOCIATED REMOVABLE CONNECTOR

The present invention relates to a flat windscreen-wiper blade which can be mounted on any type of drive arm.

The invention also relates to a removable connector which can couple such a flat windscreen-wiper blade with at least one given type of drive arm.

The invention has a particularly advantageous but not exclusive application in the field of windscreen-wiper systems for motor vehicles.

Compared with the straight blades currently used on most vehicles, a flat windscreen-wiper blade has the uniqueness of not having a structure with spreaders. This new generation of windscreen wipers continues to use a flexible wiping strip, but the external frame supporting it is replaced with a flexible structure formed integral with the strip.

Furthermore, as is the case with its straight counterpart in the state of the art, a flat windscreen-wiper blade comprises connecting means allowing it to be coupled with any suitably shaped drive arm. It should be remembered, at this point, that there are different types of blade arms such as, for example, hook arms, arms with lateral pivoting axes, longitudinal snap-fitting arms, etc.

Irrespective of the drive arm, flat windscreen-wiper blades currently have the drawback of not being standardised, in particular in terms of the connection means that provide their connection. In practice, there are as many types of flat windscreen-wiper blades as there are different blade arms. Moreover, a plurality of different embodiments exist for any given category of flat windscreen-wiper blades, due to the number of manufacturers in the market. This explains why, in the end, there is such a large number of flat windscreen-wiper blades integrating connection means that are specific for a given type of drive arm.

This excessive supply is certainly stimulating in terms of innovation for manufacturers wishing to distinguish themselves from their competitors. Conversely however, the increased number of references in the production and/or distribution stages represents a considerable expense. Due to a lack of standardisation, the price of flat windscreen-wiper blades therefore remains very high.

Also, the technical problem that the present invention aims to solve is to provide a flat windscreen-wiper, in particular for a motor vehicle windscreen-wiper system, comprising a wiping strip on which a linking support is mounted for connecting it, a windscreen-wiper blade which avoids the problems of the state of the art by being substantially less expensive than its counterparts in the state of the art, while being potentially adaptable to any type of drive arm.

The solution to the technical problem posed consists, according to the present invention, of the linking support being capable of being solidly and rigidly attached in a removable manner to a connector which can, in turn, be coupled in a removable manner with a drive arm.

It is understood that any known technique for solid attachment allowing rigid yet reversible connection can advantageously be used to assemble the linking support with the connector.

The invention also relates to any associated removable connector, which is to say any connector capable of coupling such a flat windscreen-wiper blade with a drive arm, in particular of a motor vehicle windscreen-wiper system. Such a connector is remarkable in that it is capable, on the one hand, of being solidly and rigidly attached in a removable manner to the linking support of the flat windscreen-wiper blade and, on the other hand, of being coupled in a removable manner with the drive arm.

In perfect symmetry with that described in the preceding paragraph, it is also understood that any known solid attachment technique enabling a rigid yet reversible link can advantageously be used to provide the assembly between the connector and the linking support of the flat windscreen-wiper blade.

The invention as defined has the advantage of enabling the design of a completely standard flat windscreen-wiper blade, therefore providing an intrinsically low cost price, while retaining perfect adaptability to the various types of existing drive arms. The latter characteristic is advantageously obtained thanks to the fact that a flat windscreen-wiper blade according to the invention can be coupled reversibly and alternately with different removable connectors which are respectively compatible with at least one given type of drive arm.

Since the connector part of the windscreen-wiper blade is removable, it can be changed very easily according to the nature of the drive arm on which said blade is to be mounted. The wiping part of the flat windscreen-wiper blade can always be the same, which ensures its universal nature which is particularly advantageous in the end in terms of cost.

The fact that the wiping part is separate from the connector part of the flat windscreen-wiper blade is also relevant due to the fact that these two elements have completely different lifespans. Since the wiping strip lasts around three times less than the connector, objectively speaking, it seems economically advantageous for a consumer to be able to change these elements according to their specific wear cycles.

The present invention also relates to the characteristics that appear from the following description, which should be considered in isolation or in any technically feasible combination.

This description, given by way of non-limiting example, aims to provide a clearer understanding of what the invention consists of and how it can be implemented. The description is also made in reference to the appended drawings, wherein.

Figure 3:
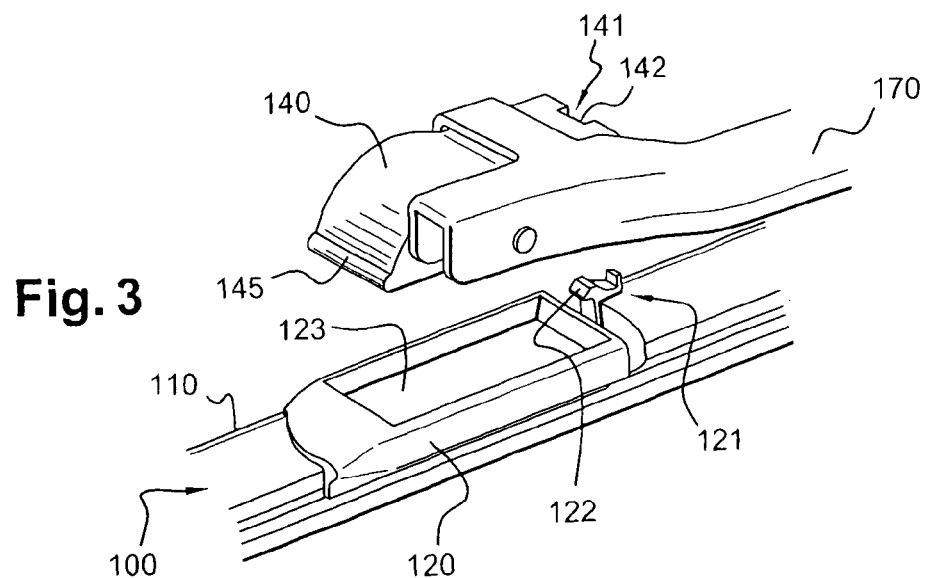
FIG. 3 shows the flat windscreen-wiper blade of FIG. 1 and the rotary connector coupled with its drive arm of FIG. 2, at the beginning of the assembly phase.
Figure 4:
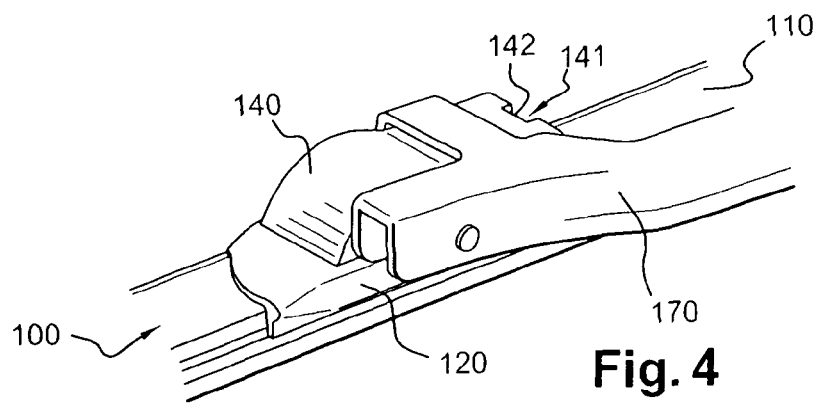

FIG. 4 constitutes a similar view to FIG. 3, but showing the flat windscreen-wiper blade and the rotary connector at the end of the assembly phase.

Figure 5:
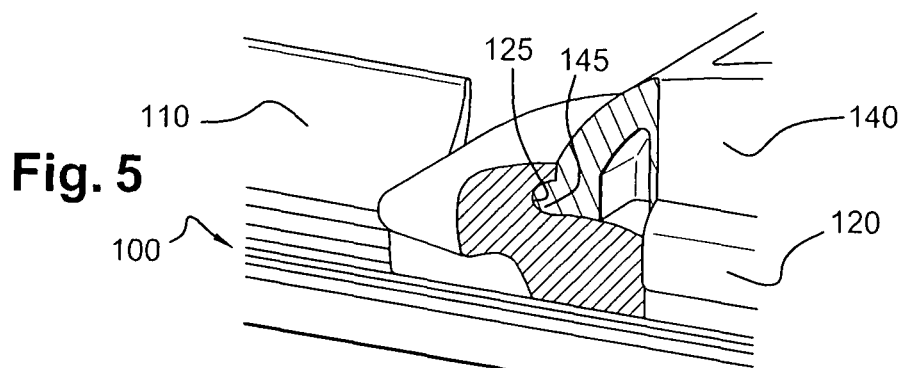

FIG. 5 is a partial cross-section showing the front part of the assembly shown in FIG. 4.

Figure 6:
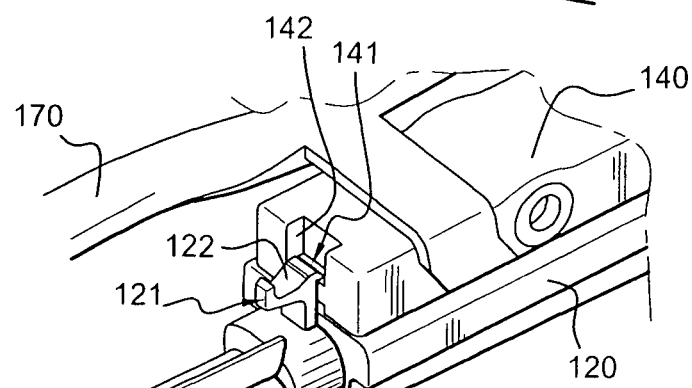

FIG. 6 shows a detailed view of the rear part of the assembly shown in FIG. 4.

Figure 1:
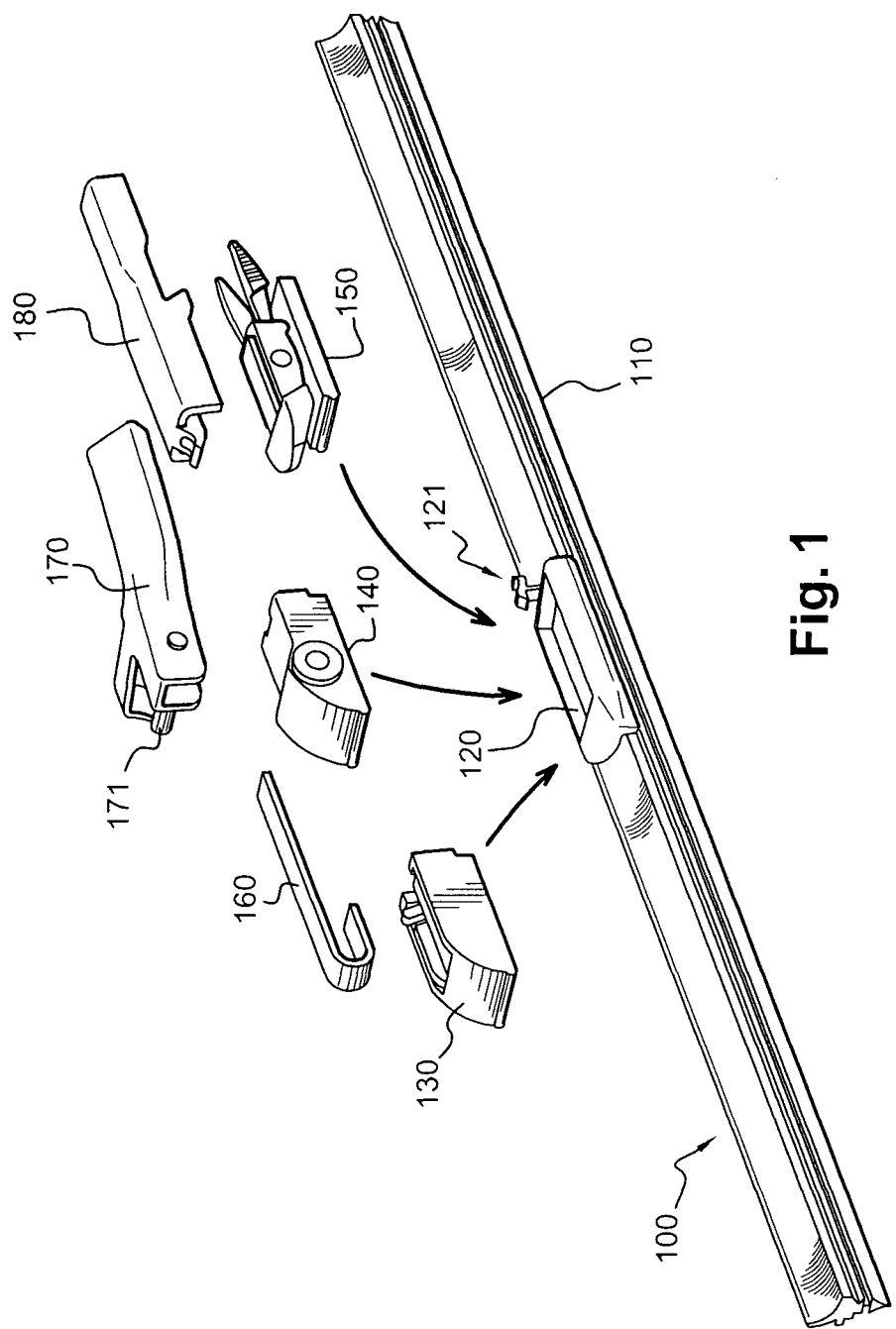
FIG. 1 is an overall view which depicts the possible assembly combinations between a flat windscreen-wiper blade according to a first embodiment of the invention and three removable connectors which are respectively compatible with three different types of drive arm.
Figure 7:
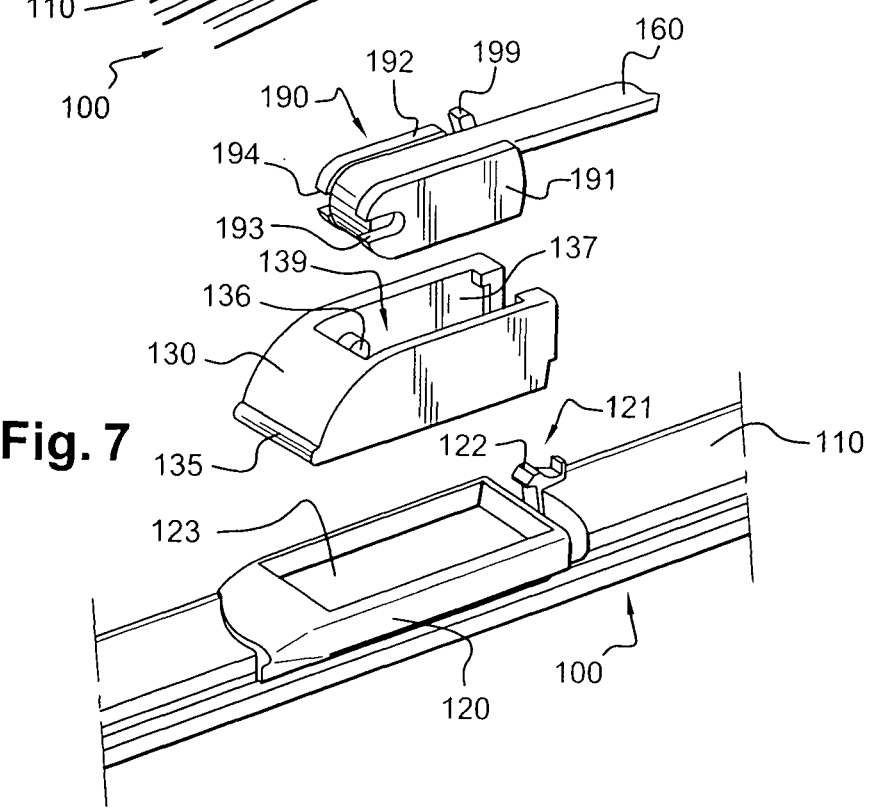

FIG. 7 is an exploded view depicting a second connector of FIG. 1 and its associated drive arm prior to coupling; this second connector variation being a hook connector, the associated arm being a hook arm.

Figure 8:
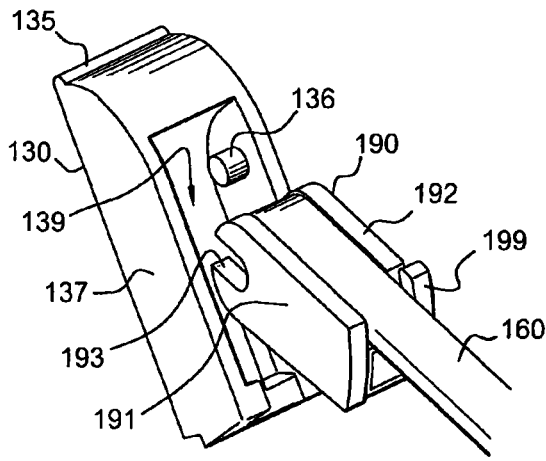

FIG. 8 is a perspective view showing the coupling between the hook connector on the one hand, and an adaptor coupled with the hook arm on the other hand.

Figure 9:
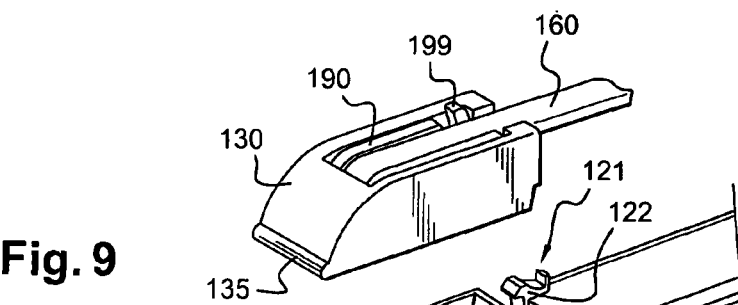

FIG. 9 shows the flat windscreen-wiper blade of FIG. 1 and the pre-assembled assembly of FIG. 8, at the beginning of the assembly phase.

Figure 10:
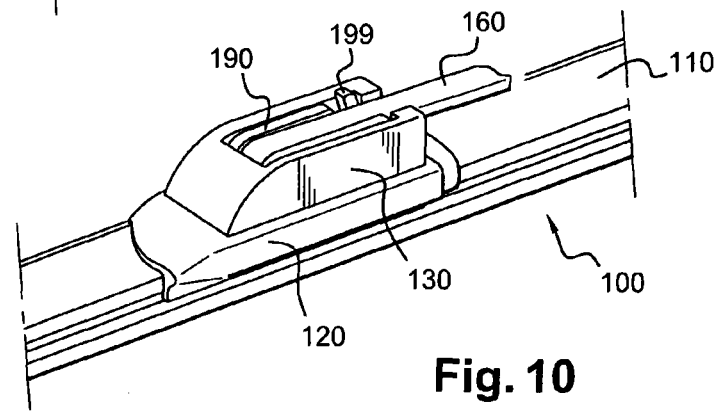

FIG. 10 constitutes a similar view to FIG. 9, but showing the flat windscreen-wiper blade and the hook connector at the end of the assembly phase.

Figure 11:
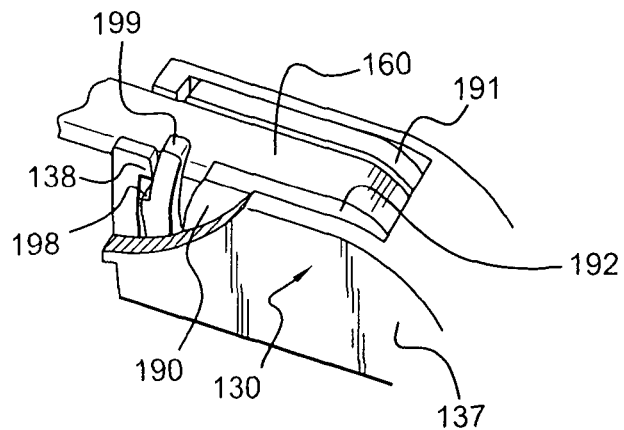

FIG. 11 is a partial cross-section showing the relative mobility between the adaptor and the hook connector of FIGS. 7 to 10.

Figure 12:
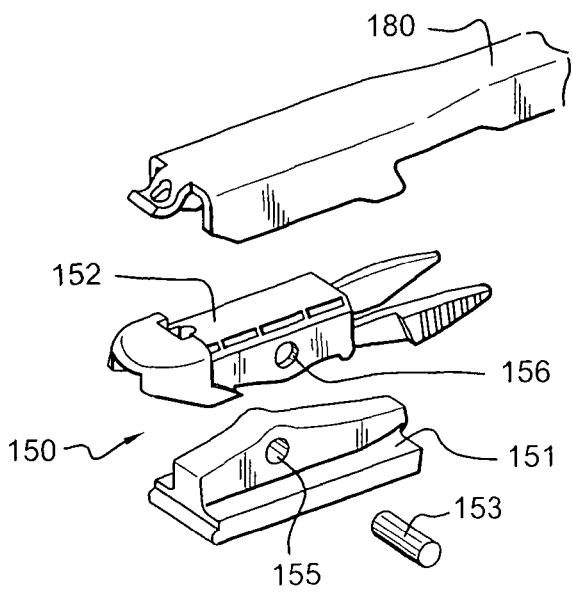

FIG. 12 is an exploded view depicting a third connector of FIG. 1 and its associated drive arm prior to coupling; this third connector variation being of snap-fitting type, the associated arm being a snap-fitting arm.

Figure 13:
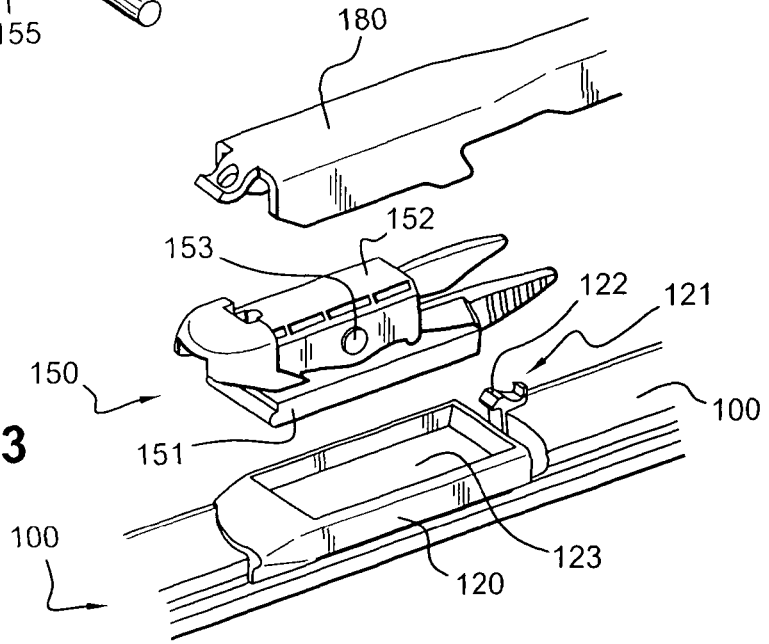

FIG. 13 shows the flat windscreen-wiper blade of FIG. 1 and the snap-fitting connector and its associated drive arm of FIG. 12, at the beginning of the assembly phase.

Figure 14:
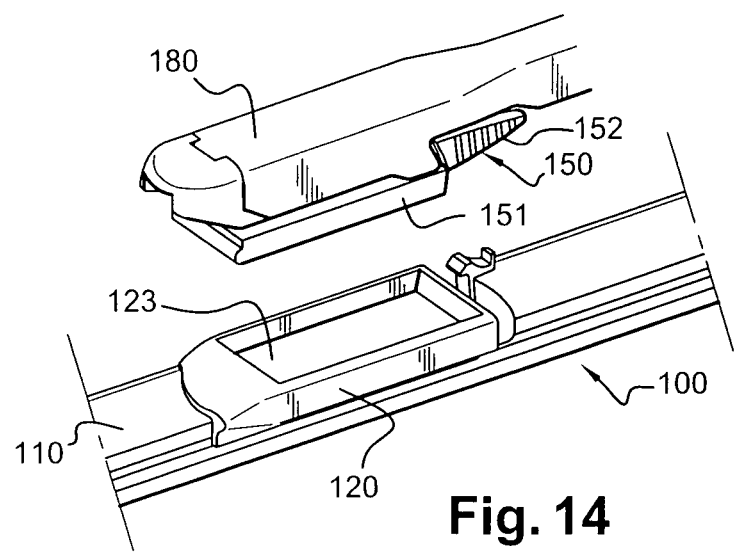

FIG. 14 is a view similar to FIG. 13, in which the snap-fitting connector is simply coupled with its drive arm.

Figure 15:
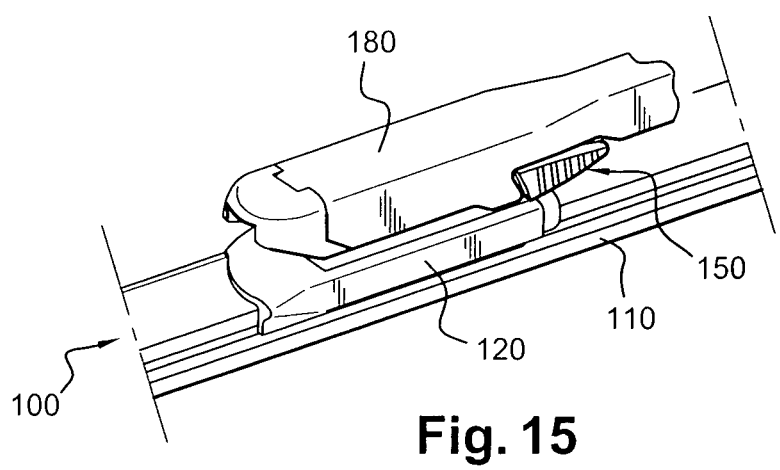

FIG. 15 constitutes a similar view to FIGS. 13 and 14, but showing the flat windscreen-wiper blade and the snap-fitting connector at the end of the assembly phase.

Figure 16:
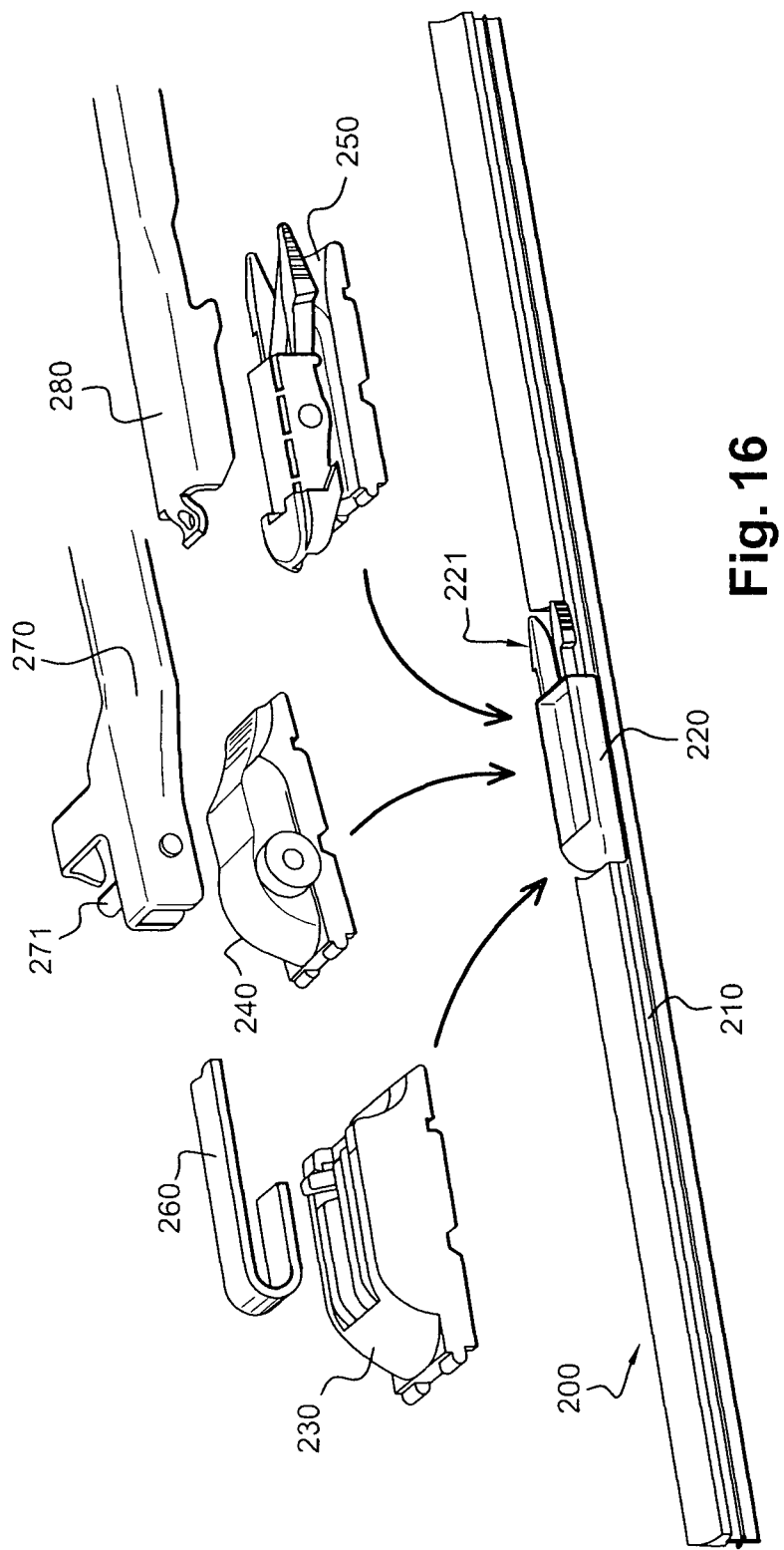

FIG. 16 depicts the possible assembly combinations between a flat windscreen-wiper blade according to a second embodiment of the invention, and three removable connectors which are respectively compatible with three different types of drive arm.

Figure 17:
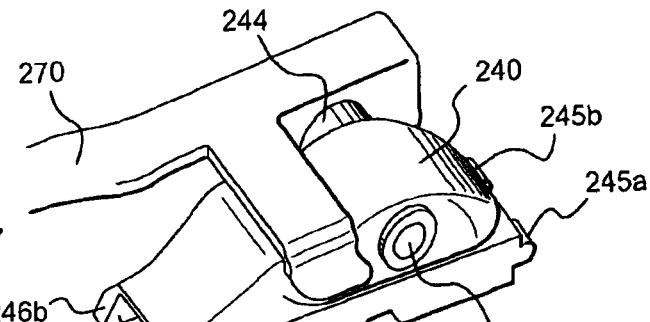

FIG. 17 shows a detailed view of a first connector of FIG. 16 coupled with its drive arm; this first connector variation being of rotary type, the associated arm being of the type with a lateral pivoting axis.

Figure 18:
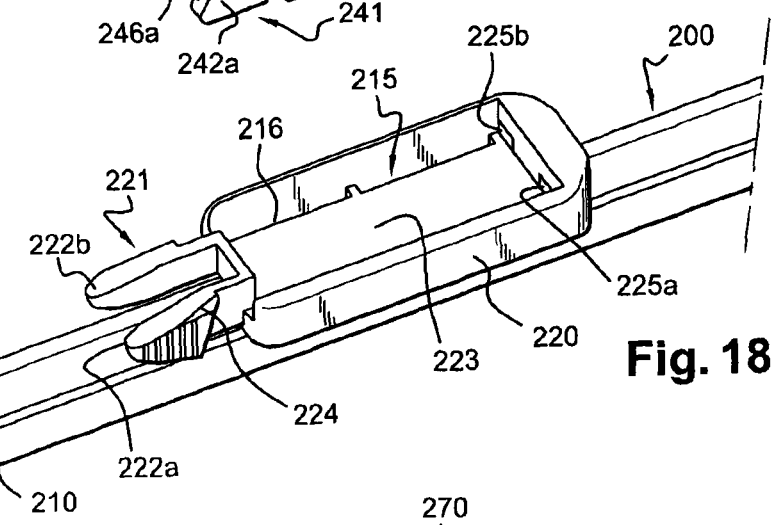

FIG. 18 shows a detailed view of the flat windscreen-wiper blade of FIG. 16, prior to assembling the assembly in FIG. 17.

Figure 19:
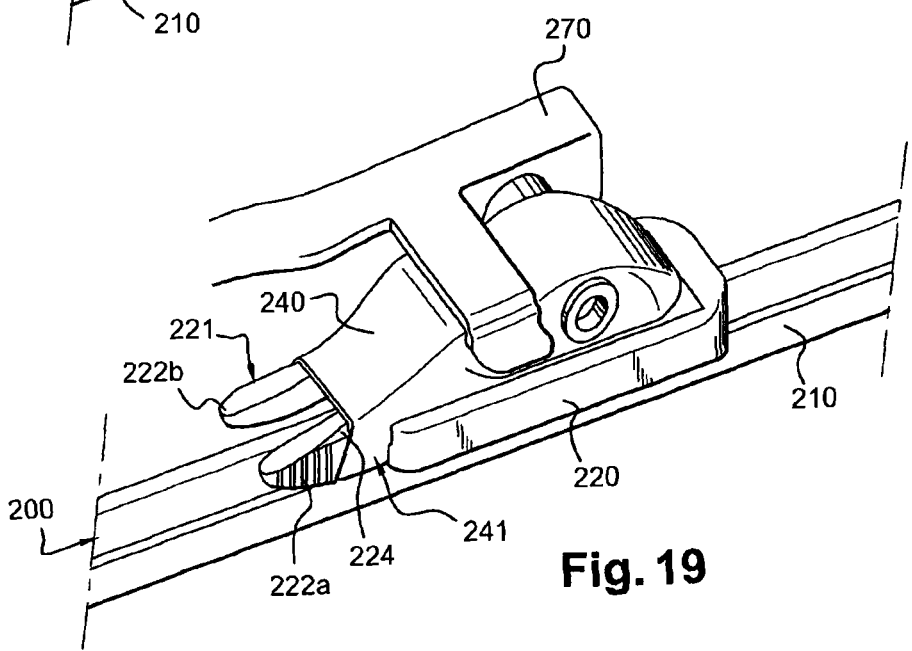

FIG. 19 shows the assembly of FIG. 17 and the flat windscreen-wiper blade of FIG. 18, once assembled.

Figure 20:
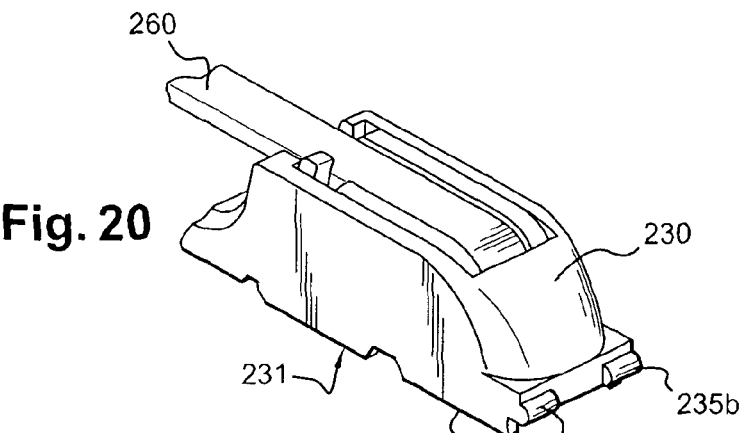

FIG. 20 shows a top front perspective view of a second connector of FIG. 16, coupled with its drive arm; this second connector variation being a hook connector, the associated arm being a hook arm.

Figure 21:
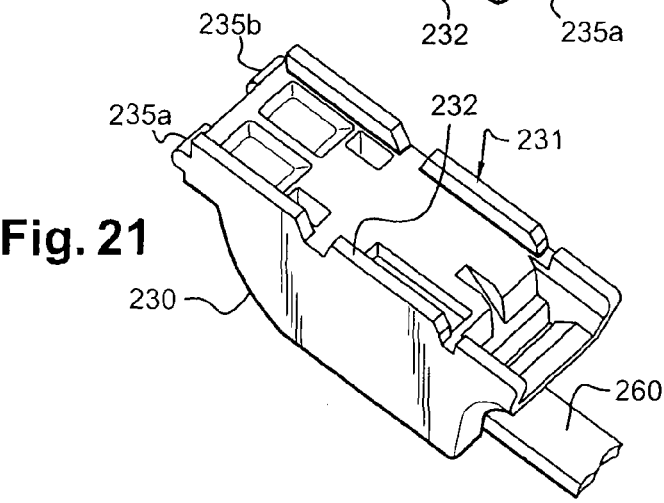

FIG. 21 is a view similar to that of FIG. 20, but in a bottom perspective view.

Figure 22:
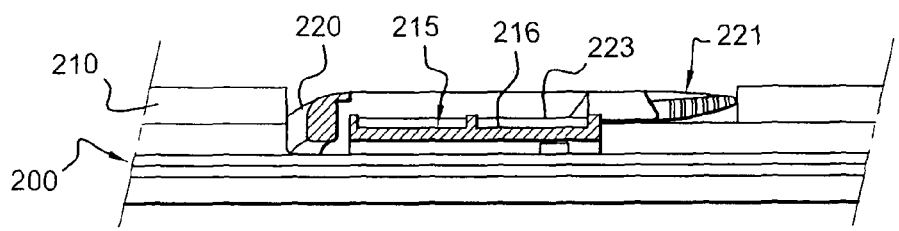

FIG. 22 is a longitudinal section view of the flat windscreen-wiper blade of FIG. 18.

Figure 23:
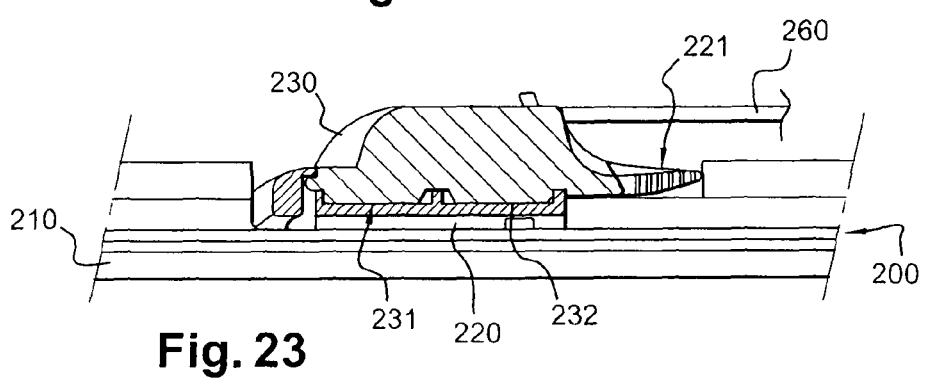

FIG. 23 is a similar view to FIG. 22, after assembly with the assembly of FIGS. 20 and 21.

Figure 24:
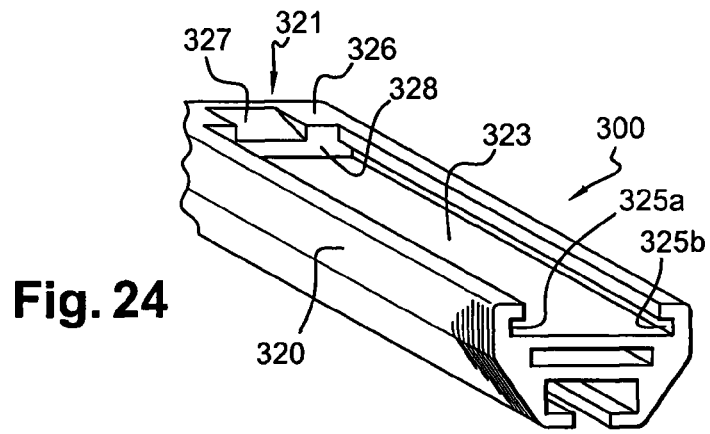

FIG. 24 shows a top perspective view of a linking support of a flat windscreen-wiper blade according to a third embodiment of the invention.

Figure 25:
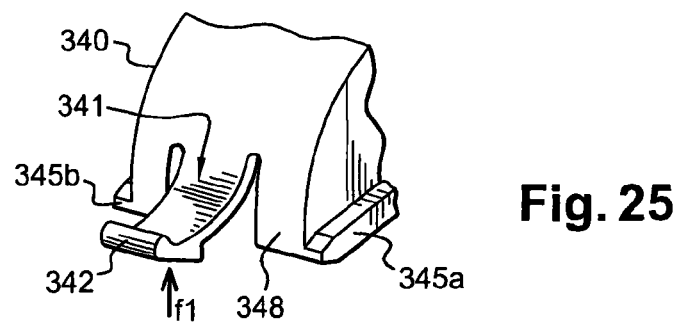

FIG. 25 shows a top perspective view of the front part of a removable connector which is compatible with the linking support of FIG. 24.

Figure 26:
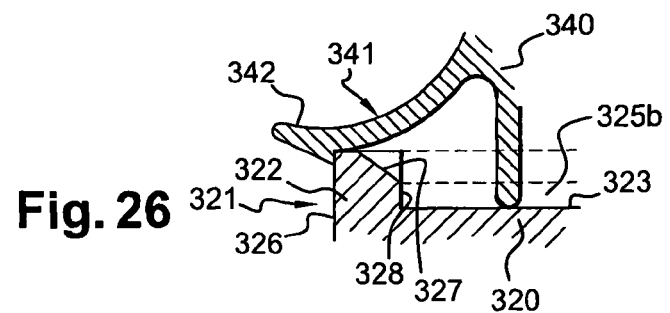

FIG. 26 shows a partial longitudinal cross-section of the linking support of FIG. 24 and of the removable connector of FIG. 25, once completely interlocked together.

FIG. 27 shows a top perspective view of a linking support of a flat windscreen-wiper blade according to a fourth embodiment of the invention.

FIG. 28 shows a bottom perspective view of a removable connector which is compatible with the linking support of FIG. 27.

FIG. 29 is a side view showing the linking support of FIG. 27 and the removable connector of FIG. 28, once completely interlocked together.

FIG. 30 is a view similar to that of FIG. 29, but in a cross-section view.

Figure 31:
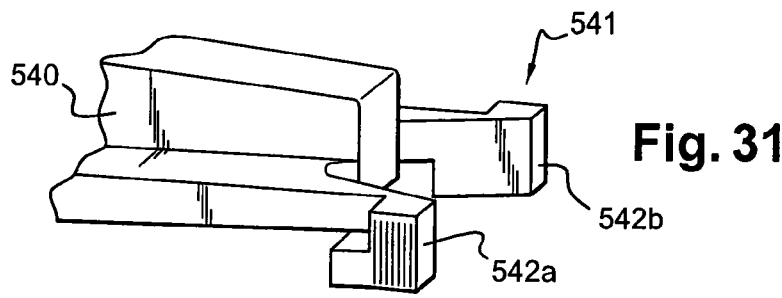

FIG. 31 shows a perspective view of the rear of a connector according to a fifth embodiment of the invention.

Figure 32:
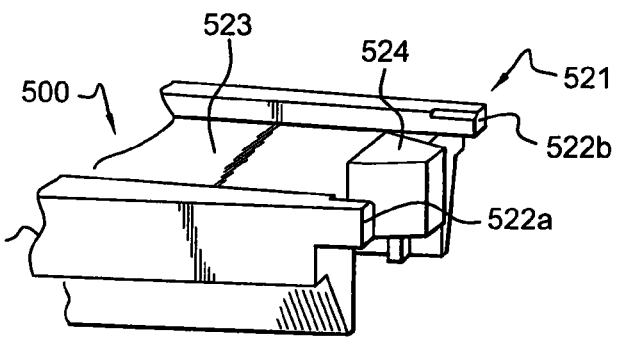

FIG. 32 shows a perspective view of the rear of a linking support according to the fifth embodiment of the invention.

Figure 33:
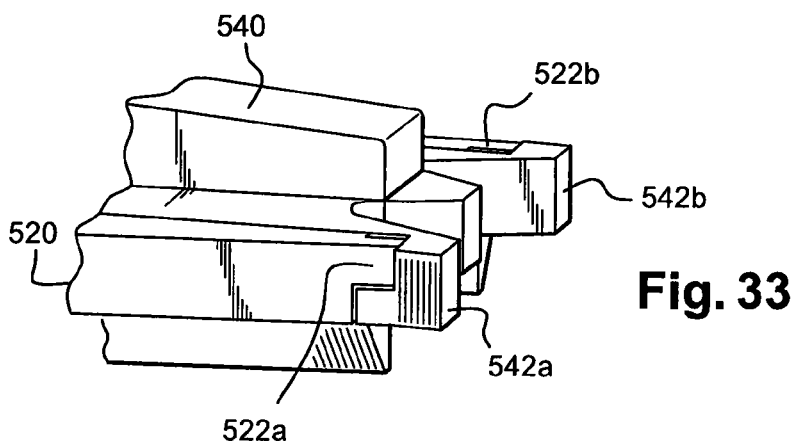

FIG. 33 shows the assembly of the connector of FIG. 31 with the linking support of FIG. 32.

Figure 34:
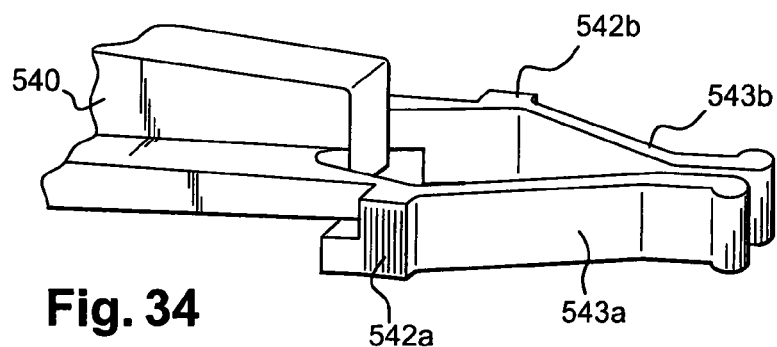

FIG. 34 shows a variation of the fifth embodiment of the invention.

For reasons of clarity, the same references are used to designate identical elements. Similarly, only the elements which are essential for understanding the invention are shown, without being drawn to scale and in diagrammatic manner.

FIGS. 1 to 15 show a flat windscreen-wiper blade 100 which is designed to equip a motor vehicle windscreen-wiper system, according to a first embodiment of the invention. This flat windscreen-wiper blade 100 is usually equipped with a wiping strip 110 on which a linking support 120 is mounted for connecting said flat windscreen-wiper blade 100.

In this specific embodiment, chosen solely as an example, the wiping strip 110 is presented in the form of a flexible elastomer profile, formed integral with a flexible structure which supports it.

The flexible profile consists mainly of a lip designed to cooperate directly by sliding contact with a surface to be wiped, and of a heel forming an interface between said lip and the flexible structure.

As for the flexible structure in question, it consists of two elastically deformable metal tongues, integrated longitudinally and respectively on each surface of the flexible profile. Each tongue, commonly called a spine, is responsible for distributing the load pressure evenly across the length of the wiping strip 110 with a view to optimising the wiping quality.

Traditionally, the flexible profile and the two spines are kept solidly attached by means of the linking support 120. For this purpose, the latter is commonly equipped with claws which grip the two spines at the central area of the flat blade 100. The linking support 120 must have considerable rigidity in order to guarantee the resistance of the assembly, which is why it is made from Zamak in this case.

In accordance with the aim of the present invention, the linking support 120 of the flat windscreen-wiper blade 100 can be solidly and rigidly attached in a removable manner to a connector 130, 140, 150 which can, in turn, be coupled in a removable manner with a drive arm 160, 170, 180.

As can be seen in the example in FIG. 1, there are three different types of connectors which can be coupled with the flat blade. The first type is a hook connector 130 designed to be coupled with a hook arm 160. Next is a rotary connector 140 and its arm 170 with a lateral pivoting axis 171. Finally, there is a snap-fitting connector 150 and the associated longitudinal snap-fitting drive arm 180.

According to one special feature of the invention, the linking support 120 can be solidly attached to the removable connector 130, 140, 150 by snap-fitting. In this respect it is understood that, according to its use, the term "snap-fitting" refers to any technique of assembly by deformation. More specifically, it involves interlocking by elastic deformation, which is capable of performing rigid but reversible attachment. Regardless of the above, snap-fitting has the advantage of being an assembly technique that is quick, easy to implement and reliable.

According to another special feature of the invention, the linking support 120 is capable of interlocking at least partially with the connector 130, 140, 150 and it is also equipped with locking means 121 which are capable of holding said linking element 120 and said connector 130, 140, 150 in a completely interlocked position.

In this assembly principle, the purpose of interlocking is to ensure the correct relative position of the linking support 120 and the connector 130, 140, 150. The locking means 121 have the purpose of guaranteeing that these two elements 120, 130, 140, 150 are immobilised in relation to one another.

It should also be noted that the linking support 120 and the connector 130, 140, 150 can be interlocked in any direction, which is to say longitudinal, transversal or oblique.

In a particularly advantageous manner, the linking support 120 and the connector 130, 140, 150 are interlocked in a given direction. Furthermore, the assembly is arranged so that the locking means 121 are capable of locking the relative mobility between said linking element 120 and said connector 130, 140, 150 in the interlocking direction.

It should be noted that the term "interlocking direction" should be understood in the broadest sense of the term, which is to say that it designates, in a very general manner, the trajectory corresponding to the relative movement which enables the linking support 120 to interlock with the connector 130, 140, 150. The relative movement in question can be a linear movement, a circular movement, or any combination of these movements.

The connector 130, 140, 150 is immobilised in relation to the linking support 120 through the combined action of interlocking and locking. In other words, this means that in this embodiment the locking means 121 are not capable, by themselves, of immobilising the connector 130, 140, 150 with regard to the linking support 120.

According to another special feature of the invention, the linking support 120 can interlock selectively with a first part of the connector 130, 140, 150. As for the locking means 121, they can locally support a second part of the connector 130, 140, 150. The assembly is furthermore arranged so that that the second part is positioned substantially opposite the first.

As can be seen more clearly in FIG. 3, the locking means 121 are equipped with a locking element 122 which is, firstly, capable of elastically deforming to enable the linking support 120 and the connector 140 to interlock, known as main interlocking. However, this locking element 122 can also lockingly cooperate by interlocking with a substantially complementary portion 142 of the connector 140, once the main interlocking is completed. The assembly is arranged in such a way that the locking interlocking between the locking element 122 and the corresponding portion 142 of the connector 140 is carried out in a direction substantially perpendicular to the main interlocking direction, thus locking the relative mobility between the connector 140 and the linking support 120.

In this particular example of an embodiment, the locking element 122 consists of an elastically deformable tongue, the free end of which is hook-shaped. This tongue is arranged at the middle on the rear of the linking support 120 and extends perpendicularly in relation to the plane of the flat windscreen-wiper blade 100, which is to say substantially parallel to the main interlocking direction.

Figure 2:
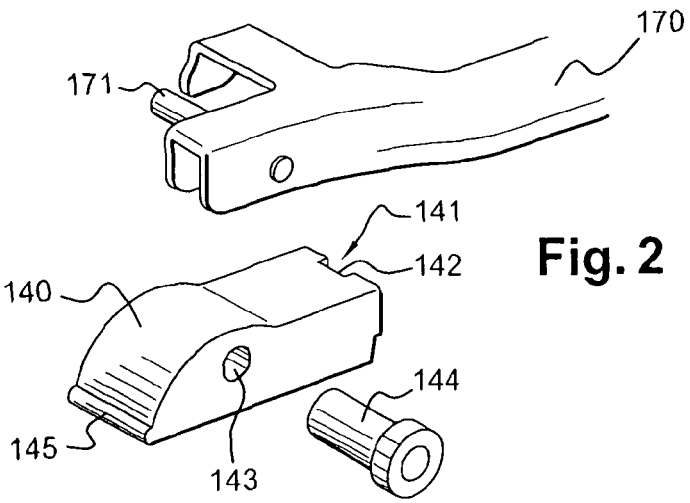
FIG. 2 is an exploded view of a first connector of FIG. 1 and its associated drive arm prior to coupling; this first connector variation being of rotary type, the associated arm being an arm with a lateral pivoting axis.

FIG. 2 shows a more detailed view of the rotary connector 140 which, in this first alternative embodiment, is designed to couple the arm 170 with the lateral pivoting axis 171, shown here, with the previously described flat windscreen-wiper blade 100.

According to one special feature of the invention, this connector 140 can, on the one hand, be solidly and rigidly attached in a removable manner to the linking support 120 of the flat windscreen-wiper blade 100 and, on the other hand, be coupled in a removable manner with its associated drive arm 170.

It is understood that the coupling between the rotary connector 140 and the associated drive arm 170 in this case involves pivotingly mobile mounting of said connector 140 in relation to said drive arm 170. In accordance with FIG. 2, the rotary connector 140 is, for this purpose, traditionally equipped with a blind bore 143 in which a bearing 144 is inserted, which can accommodate the pivoting axis 171 arranged laterally at the end of the drive arm 170. The corresponding assembly can be seen in FIG. 3, which shows the very beginning of the assembly phase with the flat windscreen-wiper 100.

It can be seen that the connector 140 in this case can only be coupled with a drive arm 170 having a lateral pivoting axis 171. However, according to one advantageous characteristic of the invention, a single connector 130, 140, 150 can very well be capable of alternately, which is to say, by turns, being coupled with at least two different types of drive arms 160, 170, 180.

In a very logical manner, comparable to that described previously in the context of describing the characteristics of the flat windscreen-wiper blade 100, the rotary connector 140 in this case can be solidly attached to the linking support 120 by snap-fitting.

In the same way, the rotary connector 140 can interlock at least partially with the linking support 120, and it also comprises attachment means 141 which are capable of holding it in a completely interlocked position with said linking support 120.

The comments made during the description of the flat windscreen-wiper blade 100 concerning the purpose of interlocking, the purpose of the locking means 121 and the interlocking direction obviously also apply here in the same way regarding the associated connector 140.

According to another special feature of the invention, the connector 140 is interlocked with the linking support 120 in a given direction. Furthermore, the assembly is arranged so that the attachment means 141 can lock the relative mobility between the connector 140 and the linking element 120, according to the interlocking direction.

The observations made in the description of the flat windscreen-wiper blade 100 concerning the nature of the relative interlocking movement and immobilisation by the locking means 121, are also relevant here.

According to another characteristic that can be compared with one of the special technical characteristics of the flat windscreen-wiper blade 100, the rotary connector 140 can interlock selectively with a first part of the linking support 120 (FIG. 5). Furthermore, the attachment means 141 can locally support a second part of the linking support 120 (FIG. 6). And the assembly is arranged in such a way that the second part is positioned substantially opposite the first.

As can be seen in particular in FIG. 6, the attachment means 141 arranged on the rotary connector 140 consist in this case of an anchoring element 142 which can cooperate by locking interlocking with a substantially complementary part of an elastically deformable element 122 solidly attached to said linking support 120. The assembly is arranged so that, on the one hand, the locking interlocking in question takes place as soon as the main interlocking between the connector 140 and the linking support 120 is complete and, on the other hand, so that it is then performed in a direction substantially perpendicular to the main interlocking direction.

In this particular example of an embodiment, the anchoring element 142 consists of a housing arranged at the middle on the rear of the connector 140. This housing is shaped so as to serve as a support and locking area for any suitably shaped elastically deformable locking element 122, which is solidly attached to the linking support 120 of the flat windscreen-wiper blade 100.

FIGS. 3 to 6 show, more specifically, the assembly between the rotary connector 140 and the linking support 120 of the flat windscreen-wiper blade 100 of this first embodiment of the invention.

In practical terms, the linking support 120 is equipped at the top with a housing, forming a container 123 with a shape that substantially complements the bottom of the rotary connector 140. The rim delimiting the container 123 is designed both to guide the insertion of the rotary connector 120 and to contribute to its support due to the interlocking effect it generates.

A transversal groove 125 is furthermore arranged inside the container 123, on the front edge to be precise (FIG. 5). It is designed to participate in the selective interlocking between the rotary connector 140 and the linking support 120.

The elastically deformable locking element 122, responsible for immobilising the rotary connector in its interlocked position with the linking support 120, is arranged at the middle of the rear of said linking support 120, parallel to the sagittal plane of the flat windscreen-wiper blade. The assembly is arranged so that the free end of the locking element 122 extends facing the rear area of the container 123.

As for the connector 140, it is equipped at the front with a transversal shoulder 145, with a shape that substantially complements that of the linking support 120 groove 125. It also includes a housing forming an anchoring element 142 which is, however, arranged at the rear. This anchoring housing is shaped so as to interlock with the free hook-shaped end of the locking element 122.

According to FIG. 3, the assembly of the rotary connector 140 with the linking support 120 of the flat windscreen-wiper blade 100 begins with said rotary connector 140 being placed directly below the container 123 (FIG. 3). At the end of this relative approach movement, the rotary connector 140 is tilted slightly forwards, so as to allow the transversal shoulder 145 to be inserted in the associated groove 125 (FIG. 5).

The rear of the rotary connector 140 is then tilted downwards so as to complete the interlocking. During this operation, this rear end comes into contact with the free end of the locking element 122. However, as the latter extends facing the container 123, the entire locking element 122 deforms elastically to allow the rotary connector 140 through.

Once the linking support 120 is completely interlocked with the connector 140, the elastically deformable locking element 122 can return to its original shape. Its free end then interlocks with the anchoring housing 142 in a substantially longitudinal movement in relation to the blade (FIG. 6), thus locking the rear of the connector 140 according to FIG. 4.

FIGS. 7 to 11 show a second variation of this first embodiment. It is different in that it is adapted to a hook-type drive arm.

They therefore contain the same flat windscreen-wiper blade 100, and only the connector 130 is structurally different from the one described previously as it is specific to this new type of blade arm 160. The structural differences, however, are limited to the part of the connector 130 which is directly involved in coupling with the hook arm 160. They do not therefore affect the bottom of the connector 130, which is only designed to participate in the assembly with the linking support 120. For all these reasons, only the elements directly involved in the link between the hook connector 130 and the hook arm 160 are described in detail.

In an entirely conventional manner, the connector 130 is coupled with the hook arm 160 by means of an adaptor 190. Specifically, this is an intermediate articulation part which, on the one hand, is rigidly attached to the end of the drive arm 160 (FIG. 7) and, on the other hand, is mounted mobile so as to pivot in relation to the connector (FIG. 8).

Thus, as can be seen in FIGS. 7 and 8, the adaptor 190 is presented in the form of two flanges 191 symmetrically connected to one another by a U-shaped element which can fit inside the hook arranged on the end of the drive arm 160 (FIG. 7). It can furthermore be seen that the two flanges 191, 192 are respectively equipped with two housings 193, 194, which open longitudinally at their front ends and which are respectively capable of engaging around two swivel pins 136 arranged inside the sides 137 of the hook connector 130. The assembly is formed in such a way that, once this interlocking is carried out, the adaptor 190 cannot pivot longitudinally inside the connector 130.

According to FIG. 11, locking takes place as soon as the adaptor 190 is tilted inside the connector 130. This result is obtained through the action of a system of stops involving a first stop 138 solidly attached to the connector 130 and a second stop 198 arranged along an elastically deformable tongue 199 which is solidly attached to the adaptor 190.

Specifically, when the adaptor 190 is tilted inside the connector 130, it first causes the tongue 199 to withdraw by elastic deformation. The second stop 198 can then get around its counterpart on the connector 130, according to the pivoting of the adaptor 190. The adaptor 190 snap-fits into the connector 130 as soon as the tongue 199 returns to its initial resting position, which is to say after completely crossing the stops 198, 199.

However, the assembly arranged so that, once inserted and locked inside the connector 130, the adaptor 190 continues to enjoy a certain pivoting mobility. The range of movement is angularly limited in a straightforward manner by the previously described system of stops.

As can be seen in FIGS. 7 to 11, the free end of the tongue 199 juts out in relation to the top surface of the adaptor 190. The aim is for it to remain manually accessible, even once the adaptor 190 is snap-fitted in the connector 130 (FIGS. 9 to 11). This characteristic is justified when the connector 130 and its associated hook arm 160 are to be disassembled.

This embodiment finally proves to be extremely advantageous from an aesthetic point of view, in that it considerably reduces the dimensions of the opening 139 made in the top of the connector 130 to allow the adaptor 190 coupled with the hook arm 160 to be inserted (FIG. 8). Indeed, in the hook assembly systems of the state of the art, the length of the opening 139 is always substantially greater than that of the adaptor 190, so as to leave enough space during assembly for the drive arm to pass right through the connector 130. And yet, this is not entirely necessary here since the arm 160 is inserted in an entirely direct manner in relation to the swivel pins 136. Overall, it is therefore quite feasible to use an opening 139 with dimensions that match those of the adaptor 190, simply increased by the oil clearance values.

FIGS. 9 and 10 show the assembly of the hook connector 130 with the flat windscreen-wiper blade 100. The comments relating to this operation are the same as those made in relation to FIGS. 3 and 4.

FIGS. 12 to 15 show a third variation of the first embodiment of the invention. It is notable in that it is adapted to a longitudinal snap-fitting drive arm 180.

As in the second variation, only the connector 150 has structural differences in relation to that described previously, since it is of snap-fitting type. However, once again, the structural differences in question are limited to the part of the connector 150 which is directly involved in coupling with the longitudinal snap-fitting arm 180. As a result, only these are described below.

As can be seen in FIG. 12, the connector 150 consists mainly of two elements 151, 152 which are mounted in a transversally pivoting manner in relation to one another by means of a pin 153. The bottom element of the connector 150 forms an interface with the linking support 120 of the flat windscreen-wiper 100, while the top element 152 constitutes an interface with the longitudinal snap-fitting arm 180. The articulation between the flat windscreen-wiper 100 and the drive arm 180 is therefore provided by the intrinsic structure of the connector (FIG. 13).

The bottom element 151 of the connector 150 does not require any specific comments, other than that it is shaped so as to be solidly attached to the linking support 120 of the flat windscreen-wiper 100, according to the previously described common assembly principle. It is stated simply that a through bore 155 is arranged transversally in order to receive the pivoting pin 153 (FIG. 12).

As for the top element 152 of the connector 150, it has the shape of a conventional attachment for a longitudinal snap-fitting arm 180, in the sense that it conforms in every respect to the attachments that are directly formed integral with certain flat windscreen-wiper blades of the state of the art. For this reason, it will not be described further here, and neither will the operation for coupling it with the end of the longitudinal snap-fitting arm 180 (FIGS. 13 and 14). However, it should be noted that the top element 152 is furthermore equipped with two through bores 156 (FIG. 12) which are designed to be positioned facing the through bore 155 of the bottom element 151, so as to support the ends of the pivoting axis 153.

FIGS. 14 and 15 show the assembly of the connector 150 with the flat windscreen-wiper blade 100. The comments relating to this operation are identical to those already made during the descriptions of the other variations.

FIGS. 16 to 23 depict a wiping device which conforms to a second embodiment of the invention while still being designed to equip a windscreen-wiper system of a motor vehicle. Compared with its counterpart in the first embodiment as previously described, the flat windscreen-wiper blade 200 is different essentially in the locking means 221 that equip its linking support 220. This characteristic obviously has a major effect on the structure of the various types of connectors 230, 240, 250 that can potentially be attached and, in particular, on their assembly means.

As can be seen in the example of FIG. 16, the flat windscreen-wiper blade 200 can, in this case, be mounted equally on the respective ends of a hook arm 260, of an arm with a lateral pivoting axis 271 or of a longitudinal snap-fitting arm 280. The hook connector 230, the rotary connector 240 and the snap-fitting connector 250 required for these different assembly options have structural and functional similarities with their counterparts in the first embodiment. The coupling principles for each type of drive arm 260, 270, 280 and its associated removable connector 230, 240, 250 are indeed perfectly identical. For this reason, these coupling aspects will not be described further here.

According to FIG. 17, the rotary connector 240 of this second embodiment is equipped with attachment means 241 which comprise two anchoring elements 242a, 242b presented in the form of bearing edges 246a, 246b forming stops. They are arranged as an extension of the lateral sides of the connector 240 and extend longitudinally to the rear, with a view to cooperating by locking interlocking respectively with two elastically deformable locking elements 222a, 222b, solidly attached to the linking support 220. The assembly is furthermore arranged so that the locking interlocking in question, on the one hand, takes place as soon as the main interlocking between the connector 240 and the linking support 220 is complete and, on the other hand, is performed in a direction substantially perpendicular to said main interlocking direction.

FIG. 18 shows the structural features of the flat windscreen-wiper blade 200. It should be noted that they only affect certain parts of the linking support 220, the wiping strip 210 remaining perfectly identical.

If only the differences with the previously described first embodiment are taken into account, it can be seen first of all that the transversal groove 145 arranged at the front of the container 143 is replaced with two anchoring cavities 225a, 225b that provide an identical function (FIG. 18). This evidently implies that the transversal shoulder 145 arranged at the front of the connector 140 is replaced here with two protruding lugs 245a, 245b as can be seen in FIG. 17. These protruding lugs 245a, 245b advantageously have a shape that substantially complements that of the corresponding anchoring cavities 225a, 225b.

It can then be seen that the locking means 221, arranged on the linking support 220 consist, in this case, of two locking elements 222a, 222b presented in the form of elastically deformable tabs, forming hooks. These tabs 222a, 222b are solidly attached to the rear of the linking support 220 and extend longitudinally to the rear, so as to cooperate by locking interlocking with the two anchoring elements 242a, 242b of the rotary connector 240. The assembly is furthermore arranged so that the locking interlocking in question, on the one hand, takes place as soon as the main interlocking between the connector 240 and the linking support 220 is complete and, on the other hand, is performed in a direction substantially perpendicular to said main interlocking direction.

The assembly of the rotary connector 240 with the linking support 220 of the flat windscreen-wiper blade 200 begins with said rotary connector 240 being placed directly below the container 223. At the end of this relative approach movement, the rotary connector 240 is tilted slightly forwards so as to allow the protruding lugs 245a, 245b to be inserted in the associated anchoring cavities 225a, 225b.

The rear of the rotary connector 240 is then tilted downwards so as to complete the interlocking. During this operation, the two bearing edges 246a, 246b of the attachment means 241 come respectively into contact with the two flexible tabs 222a, 222b of the locking means 221, thus forcing them to retract inwards by elastic deformation in a plane substantially perpendicular to the sagittal plane of the flat wiper blade 200. It should be noted that this step is facilitated by the presence of external chamfers 224 which are arranged at the top of the free ends of the flexible tabs 222a, 222b.

Once the linking support 220 and the connector 240 are completely interlocked, the locking elements 222a, 222b return to their initial positions, again by elastic deformation. Their free ends interlock transversally with the anchoring elements 242a, 242b, thus locking the rear part of the connector 240. This effect, combined with the interlocking of the front part, therefore advantageously completely immobilises the connector 240 in accordance with FIG. 19.

They can be dismantled simply by exerting pressure on the free ends of the two flexible tabs 222a, 222b simultaneously until they are released from the bearing edges 246a, 246b. It is then sufficient to separate the connector 240 by first tilting the rearmost part upwards, so as then to allow the front part to be released.

FIGS. 20 to 23 show a second variation of this second embodiment, in which a hook connector 230 is used to couple the flat windscreen-wiper blade 200 with a hook arm 260.

The bottom of the hook connector 230 is not described further here, since it is completely identical to that of the previously described rotary connector 240, which is to be expected furthermore as both are adapted to be assembled with the same flat windscreen-wiper blade 200. However, FIGS. 20 and 21 clearly show the shape and the position of the protruding lugs 235a, 235b mentioned in the context of the first variation.

The same applies to the top of the hook connector 230 since, while logically different from the top of the rotary connector 240, it is not at all similar to the top of its counterpart in the first embodiment of the invention.

FIGS. 18 and 22 especially highlight the fact that, according to one advantageous characteristic of the invention, the linking support 220 also comprises centring means 215 which can position and transversally lock the connector 230, once the main interlocking between said linking support 220 and said connector 230 is complete.

In a particularly advantageous manner, the centring means 215 are equipped with at least one centring element 216 which can interlock with a part 232 with a substantially complementary shape arranged on the connector 230. The assembly is furthermore arranged in such a way that the centring interlocking is carried out in a direction substantially collinear to the main interlocking direction between the connector 230 and the linking support 220.

In the same way, these characteristics firstly imply that the hook connector 230 is equipped with guiding means 231 which can position and transversally lock the linking support 220, once the main interlocking between said connector 230 and said linking support 220 is complete.

In this case, the guiding means 231 are advantageously equipped with at least one guiding element 232 capable of interlocking with a part 216 having a substantially complementary shape, arranged on the linking support 220, in a direction substantially collinear to the main interlocking direction.

In the embodiment shown in FIGS. 18 and 20 to 23, the centring means 215 consist of four longitudinal slots 216 arranged in the bottom of the container 223, two-by-two along each side edge (FIGS. 18 and 22). As for the guiding means 231, they consist of four longitudinal ribs 232 arranged as an extension of the connector sides 230 (FIGS. 20, 21 and 23), which have shapes that substantially complement the longitudinal slots 216. The assembly is evidently arranged so that the slots 216 and the ribs 232 can engage with each other during the main interlocking (FIG. 23).

Obviously, any other elements with complementary shapes can be used in the same way to form the centring means and the guiding means, such as for example a combinations of studs and bores.

FIG. 24 shows a linking support 320 of a flat windscreen-wiper blade 300 according to a third embodiment of the invention. It should be noted that, although not directly apparent from the figures, the linking support 320 is perfectly compatible with all types of removable connectors 340 according to the invention, and in particular with hook connectors, rotary connectors, snap-fitting connectors, etc.

As shown in detail in FIG. 24, the linking support 320 is presented in the form of a profile, the top of which forms a container 323 and is laterally delimited by two guide rails 325a, 325b placed facing one another. The front of the container 323 is bordered by a transversal rim 326 forming a stop, while the rear remains open so as to allow longitudinal access to the container 323 and the guiding rails 325a, 325b.

According to one special feature of this third embodiment of the invention, the locking means 321 supported by the linking support 320 comprise an anchoring element 322 which is capable of cooperating by locking interlocking with a substantially complementary part of an elastically deformable element 342 which is solidly attached to the connector 340. The assembly is furthermore arranged so that the locking interlocking in question takes place once the main interlocking between the connector 340 and the linking support 320 is complete and in a direction substantially perpendicular to said main interlocking direction.

In this particular example of an embodiment, the anchoring element 322 consists of a front rim 326 which transversally delimits the container 323 of the linking support 320 (FIG. 26).

As for FIG. 25, it shows that each side of the removable connector 340 is equipped with a longitudinal rib 345a, 345b which extends perpendicular to the sagittal plane of said removable connector 340, with a shape that substantially complements that of each guiding rail 325a, 325b of the linking support 320.

According to one advantageous characteristic of the invention, the attachment means 341 arranged on the connector 340 are equipped in this case with a locking element 342 which can deform elastically to allow the so-called main interlocking between the connector 340 and the linking support 320. This locking element 342 can also cooperate by locking interlocking with a substantially complementary portion 322 of the linking support 320, once the main interlocking is complete (FIG. 26). Finally, the assembly is arranged so that the locking interlocking in question takes place in a direction substantially perpendicular to the main interlocking direction.

According to FIG. 25, in this particular example of an embodiment, the locking element 342 consists, specifically, of a flexible tongue arranged at the front of the removable connector 340 and extending longitudinally in the sagittal plane of said connector 340.

According to another special feature of the third embodiment of the invention, the linking support 320 can interlock along substantially the entire length of the connector 340, in a direction comprised in a plane substantially perpendicular to the sagittal plane of the flat windscreen-wiper blade 300. Furthermore, the locking means 321 can lock the relative mobility between the linking support 320 and the connector 340 in their interlocking direction.

The fact that the linking support 320 and its associated connector 340 are finally interlocked with one another substantially along their entire lengths does not depend directly on how the interlocking is carried out. It can, indeed, be carried out in any direction whatsoever, as long as said direction is comprised in a plane substantially perpendicular to the sagittal plane of the flat windscreen-wiper blade 300. Such is the case, for example, for longitudinal interlocking by the rear of a linking support, for longitudinal interlocking by the front of a linking support, for transversal interlocking by the side of a linking support, for oblique interlocking by the side of a linking support, etc.

In the present case, the assembly between the removable connector 340 and the linking support 320 begins by inserting the ribs 345a, 345b in the guide rails 325a, 325b. The connector 340 then slides along the length of the container 323 until the free end of the flexible tongue 342 comes into contact with a rising ramp 327 arranged longitudinally on the front rim 326. The sliding then continues, causing the locking element 342 to deform elastically until the front surface 348 of the connector 340 comes to a stop against the inner support surface 328 of the front rim 326. At this moment, the free end of the flexible tongue 342 returns to its original position and is locked against the front rim 326 according to FIG. 26. It should be noted that, to dismantle the flat windscreen-wiper blade 300, it suffices simply to press on the end of the locking element (FIG. 25, arrow f1), and then to pull said blade 300 forwards.

FIG. 27 shows a linking support 420 of a flat windscreen-wiper blade 400 according to a fourth embodiment of the invention, which is compatible with any type of removable connector 440 according to the invention.

This fourth embodiment of the invention differs from the previously described third embodiment essentially in that the locking means 421 are equipped in this case with a locking element 422 which is solidly attached to the linking support 420, and in that the attachment means are equipped with an anchoring element 442 arranged on the connector 440.

This configuration is actually more reliable than the previous one, since the assembly means that are a priori most fragile, namely the elastically deformable locking element 422, are in this case solidly attached to the flat windscreen-wiper blade 400, which is to say to the component that will be replaced most often. The removable connector 440, which supports the anchoring element 442, indeed benefits intrinsically from a significantly longer life span.

As can be seen in FIG. 27, the linking support 420 is substantially the same as that of the third embodiment of the invention, with the slight difference that it comprises a locking element 422 arranged at the open rear end of the container 423. In this case also, it involves an elastically deformable tongue which extends longitudinally outwards in the sagittal plane of the linking support 420.

According to FIG. 28, the main structural characteristic of the connector 440 according to the fourth embodiment essentially lies in the fact that it comprises an anchoring element 442 forming a stop. In this case, it involves a rigid tab arranged at the rear of the connector 440, which extends longitudinally outwards in the sagittal plane of said connector 440. It can furthermore be seen that a deep longitudinal groove 447 is arranged in the sagittal plane of the connector 440. It is sized to allow the locking element 422 to pass through it when the connector 440 is sliding in the linking support 420.

FIGS. 29 and 30 show the assembly of the connector 440 with the linking support 420, as well as the locking of the locking element 422 with the anchoring element 442. Since the assembly principles are similar to those of the third embodiment, they will not be described further here. Only the presence of a locking notch 429 at the free end of the locking element 422 will be noted (FIG. 27).

The fifth embodiment shown in FIGS. 31 to 33 is essentially closer to the second embodiment of FIGS. 16 to 23, with the slight difference that the removable connector 540 in this case is equipped with two locking elements 542a, 542b, while the linking support 520 consequently has two anchoring elements 522a, 522b.

As shown in FIG. 31, the locking elements 542a, 542b of the connector 540 consist of two elastically deformable tabs in a plane perpendicular to the sagittal plane. These two flexible tabs 542a, 542b are arranged in a completely symmetrical manner with the rear of the connector 540, and they extend outwards.

The associated linking support 520 can be seen in FIG. 32. It is firstly characterised by the fact that the rear rim delimiting the container 523 is open at two places on either side of a central part forming a stop 524, so as to allow the locking elements 542a, 542b through when the connector 540 is interlocked in the container 523. The linking support 520 is then differentiated by the presence of two anchoring elements 522a, 522b arranged at the rear of said linking support 520, and which extend longitudinally outwards as an extension of the lateral rims which transversally delimit the container 523.

According to FIG. 33, the assembly is arranged so that the locking elements 542a, 542b can cooperate by locking interlocking with the anchoring elements 522a, 522b as soon as the connector 540 interlocks with the linking support 520 formed integral with the flat windscreen-wiper blade 500.

The weakness of this fifth embodiment compared with the second embodiment lies in the fact that the most fragile assembly means 542a, 542b are, in this case, solidly attached to the strongest component 540 of the flat windscreen-wiper blade; conversely, the most resistant assembly means 522a, 522b are therefore attached to the least durable component 520.

FIG. 34 shows a variation of this fifth embodiment of the invention. This alternative embodiment is notable in that the elastically deformable tabs 542a, 542b, forming locking elements, are extended by tongues 543a, 543b which are also flexible, the free ends of which are almost edge-to-edge. Such an arrangement generates an elastic recall effect when the tabs are forced together, which results in guaranteed locking interlocking between the locking elements 542a, 542b and the anchoring elements 522a, 522b, and thus the locking of the assembly between the connector 540 and the linking support 520.

The invention furthermore relates to any wiping device equipped with any flat windscreen-wiper blade 100, 200, 300, 400, 500 as previously described, as well as to any removable connector, also as previously described.

Evidently, the invention also relates to any motor vehicle equipped with at least one such wiping device.

The invention claimed is:

1. A flat windscreen-wiper blade in particular for a windscreen-wiper system of a motor vehicle, comprising:
    a wiping strip on which a linking support is mounted,
    wherein the linking support is solidly attached in a removable manner to a connector, the connector coupled in a removable manner with a drive arm,
    wherein the linking support interlocks at least partially with the connector, and comprises locking means configured to hold the linking support and the connector in a fully interlocked position,
    wherein the locking means comprise at least one locking element configured to deform elastically to allow the linking support and the connector to interlock and also configured to cooperate by locking-interlocking with the connecter once a main interlocking is complete,
    wherein said locking-interlocking is carried out in a direction substantially perpendicular to a main interlocking direction, and
    wherein, while the linking support is interlocked with the connector, the linking support is immobilised with respect to the connector.

2. The flat windscreen-wiper blade according to claim 1, wherein the linking support is solidly attached to the connector by snap-fitting.

3. The flat windscreen-wiper blade according to claim 1, wherein the linking support and the connector are interlocked in a given direction, and wherein the locking means locks the relative mobility between said linking element and said connector, in the interlocking direction.

4. The flat windscreen-wiper blade according to claim 1, wherein the linking support interlocks selectively with a first part of the connector, and wherein the windshield wiper blade comprises the locking means which locally supports a second part of said connector, said second part being positioned substantially opposite the first.

5. The flat windscreen-wiper blade according to claim 1, wherein the linking support can interlock on substantially the entire length of the connector, following a direction comprised in a plane substantially perpendicular to the sagittal plane of the flat windscreen-wiper blade, and in that the locking means can lock the relative mobility between said linking support and said connector, according to their interlocking direction.

6. The flat windscreen-wiper blade according to claim 1, wherein the linking support also comprises centring means capable of positioning and transversally locking the connector, once the main interlocking between said linking support and said connector is complete.

7. The flat windscreen-wiper blade according to claim 6, wherein the centring means comprise at least one element capable of interlocking with a part with a substantially complementary shape arranged on the connector, in a direction substantially collinear to the main interlocking direction between said connector and the linking support.

8. The flat windscreen-wiper blade according to claim 1,
wherein the locking means comprises an elastically deformable tongue comprising a free end that is hook-shaped, and
wherein the deformable tongue extends perpendicularly to a plane of the flat windscreen-wiper blade.

9. A flat windscreen-wiper blade according to claim 1,
wherein the flat windscreen-wiper blade is operable to be coupled reversibly and alternately with different removable connectors which are respectively compatible with at least one given type of drive arm.

* * * * *